(12) United States Patent
Tanaka et al.

(10) Patent No.: US 10,330,181 B2
(45) Date of Patent: Jun. 25, 2019

(54) TOROIDAL CONTINUOUSLY VARIABLE TRANSMISSION

(71) Applicant: KAWASAKI JUKOGYO KABUSHIKI KAISHA, Kobe-shi, Hyogo (JP)

(72) Inventors: Kenichiro Tanaka, Kobe (JP); Hideyuki Imai, Akashi (JP); Tatsuhiko Goi, Kobe (JP); Isao Fujii, Kakogawa (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 441 days.

(21) Appl. No.: 15/290,155

(22) Filed: Oct. 11, 2016

(65) Prior Publication Data
US 2017/0030440 A1 Feb. 2, 2017

Related U.S. Application Data

(63) Continuation of application No. PCT/JP2015/061395, filed on Apr. 13, 2015.

(30) Foreign Application Priority Data

Apr. 14, 2014 (JP) ................................ 2014-082827

(51) Int. Cl.
| | | |
|---|---|---|
| *F16H 15/38* | (2006.01) | |
| *F16C 19/54* | (2006.01) | |
| *F16H 37/02* | (2006.01) | |

(52) U.S. Cl.
CPC ........... *F16H 15/38* (2013.01); *F16C 19/541* (2013.01); *F16H 37/021* (2013.01); *F16C 2361/00* (2013.01); *F16H 2015/383* (2013.01)

(58) Field of Classification Search
CPC .. F16H 15/38; F16H 37/021; F16H 2015/383; F16C 19/541
See application file for complete search history.

(56) References Cited

U.S. PATENT DOCUMENTS

| | | |
|---|---|---|
| 3,826,147 A | 7/1974 | Sharpe et al. |
| 4,850,234 A | 7/1989 | Yamazaki |
| (Continued) | | |

FOREIGN PATENT DOCUMENTS

| | | |
|---|---|---|
| DE | 102 51 560 A1 | 5/2004 |
| EP | 0 557 369 A1 | 9/1993 |
| (Continued) | | |

OTHER PUBLICATIONS

International Search Report of PCT/JP2015/061395, dated May 26, 2015. [PCT/ISA/210].

(Continued)

*Primary Examiner* — David M Fenstermacher
(74) *Attorney, Agent, or Firm* — Sughrue Mion, PLLC (57) ABSTRACT

In a continuously variable transmission including: a first transmission unit including a first input disc and a first output disc disposed coaxially and a power roller tiltably interposed between these discs; and a second transmission unit disposed coaxially with the first transmission unit, including a second input disc and a second output disc disposed coaxially and a second power roller tiltably interposed between these discs, and disposed such that a back surface of the second input disc is opposed to a back surface of the first input disc, a tubular back surface cylinder wall is provided on each of the back surfaces of the first input disc and the second input disc so as to project therefrom.

6 Claims, 5 Drawing Sheets

(56) References Cited

U.S. PATENT DOCUMENTS

| | | | |
|---|---|---|---|
| 5,338,268 A | | 8/1994 | Greenwood |
| 5,679,090 A | * | 10/1997 | Imanishi ................ F16H 15/38 |
| | | | 476/41 |
| 5,779,591 A | | 7/1998 | Inoue |
| 5,807,203 A | * | 9/1998 | Imanishi .................. F16H 1/08 |
| | | | 476/42 |
| 5,888,167 A | * | 3/1999 | Yamamoto ............. F16H 15/38 |
| | | | 476/40 |
| 5,971,886 A | | 10/1999 | Yamamoto |
| 6,117,043 A | * | 9/2000 | Imanishi ................ F16H 15/38 |
| | | | 476/40 |
| 6,206,801 B1 | * | 3/2001 | Ishikawa ................ F16H 15/38 |
| | | | 476/42 |
| 6,325,740 B1 | * | 12/2001 | Kobayashi ............. F16H 15/38 |
| | | | 411/283 |
| 6,383,113 B1 | | 5/2002 | Doppling et al. |
| 6,659,907 B2 | | 12/2003 | Hirano et al. |
| 6,666,791 B1 | | 12/2003 | Greenwood |
| 7,871,353 B2 | * | 1/2011 | Nichols .................. F16H 15/28 |
| | | | 476/37 |
| 8,313,404 B2 | * | 11/2012 | Carter .................... F16H 15/52 |
| | | | 475/192 |
| 2002/0028723 A1 | | 3/2002 | Hirano et al. |

FOREIGN PATENT DOCUMENTS

| | | | |
|---|---|---|---|
| JP | 64-79463 | A | 3/1989 |
| JP | 9-177918 | A | 7/1997 |
| JP | 2002-81519 | A | 3/2002 |
| JP | 2002-512349 | A | 4/2002 |
| JP | 2002-538394 | A | 11/2002 |
| WO | 00/52358 | A1 | 9/2000 |

OTHER PUBLICATIONS

Communication dated Aug. 8, 2017 from the Japanese Patent Office in counterpart application No. 2016-513783.

Communication dated Aug. 9, 2017 from the Canadian Intellectual Property Office in counterpart application No. 2945468.

Communication dated Nov. 21, 2017, from Japanese Patent Office in counterpart application No. 2016-513783.

International Preliminary Report on Patentability with translation of Written Opinion dated Oct. 27, 2016, issued by the International Searching Authority in application No. PCT/JP2015/061395.

Extended European Search Report dated Nov. 27, 2017, issued by the European Patent Office in counterpart European Application No. 15779298.7.

\* cited by examiner

TOROIDAL CONTINUOUSLY VARIABLE TRANSMISSION

CROSS REFERENCE TO THE RELATED APPLICATION

This application is a continuation application, under 35 U.S.C. §111(a), of international application No. PCT/JP2015/061395, filed Apr. 13, 2015, which claims priority to Japanese patent application No. 2014-082827, filed Apr. 14, 2014, the disclosure of which are incorporated by reference in their entirety into this application.

BACKGROUND OF THE INVENTION

Field of the Invention

The present invention relates to a structure of a toroidal continuously variable transmission for use in, for example, an electric power generating device for an aircraft.

Description of Related Art

As an electric power generating device for an aircraft, it is known to use a constant frequency generator (IDG) that operates while keeping a rotation rate (frequency) of a generator constant even when a rotation rate of an aircraft engine, which is a drive source, varies. As a transmission for keeping a rotation rate of the generator constant in the IDG, a toroidal continuously variable transmission has been proposed. The toroidal continuously variable transmission includes a toroidal transmission unit that includes: an input disc and an output disc concentrically arranged so as to be opposed to each other; and a power roller that is brought into contact with opposed curved concave surfaces of both discs at high pressure. By adjusting a tilt angle of the power roller relative to both discs, it is possible to steplessly (continuously) vary a gear ratio.

In general, as a toroidal continuously variable transmission, a double-cavity-type is adopted in which the two toroidal transmission units are arranged coaxially. As a double-cavity-type toroidal continuously variable transmission, a transmission in which two discs of two toroidal transmission units which two discs are adjacent to each other at an axially central portion are integrally formed (see, e.g., Patent Document 1) and a transmission in which such two discs are formed as separate members (see, e.g., Patent Document 2) are known. In the disc-integrated-type transmission, deformation, in the axial direction, of the two discs arranged at the axially central portion is small, and the entire transmission can be configured with a small size and a light weight. Meanwhile, in the disc-separate-type transmission, since a gear for input and output can be disposed between the discs adjacent to each other at the axially central portion, the outer diameter of the gear can be reduced to suppress an increase in the circumferential speed of the gear.

RELATED DOCUMENT

Patent Document

[Patent Document 1] JP Laid-open Patent Publication No. 2002-081519
[Patent Document 2] JP Laid-open Patent Publication No. H09-177918

SUMMARY OF THE INVENTION

However, in the case where the two discs adjacent to each other at the axially central portion are integrally formed, since the gear is provided at an outer peripheral portion of the input disc, the outer diameter of the gear increases, so that the circumferential speed of the gear increases. As a result, oil agitation loss by the gear increases, so that the efficiency of the electric power generating device decreases.

On the other hand, in the case where the two discs at the axially central portion are formed as separate members, a bearing for rotatably supporting an input gear is disposed between these discs. The back surfaces of both discs are also supported by bearings disposed at positions close to the axial center. Thus, deformation of the discs supported by these bearings, that is, amounts by which the outer peripheral portions of the discs fall down in the axial direction, increases, so that the reliability of the continuously variable transmission decreases.

Therefore, in order to solve the above-described problems, an object of the present invention is to provide a double-cavity-type toroidal continuously variable transmission that can reduce oil agitation loss by a gear while suppressing an increase in the size of the continuously variable transmission and maintaining high reliability.

In order to achieve the above-described object, a toroidal continuously variable transmission according to the present invention includes: a first transmission unit including: a first input disc and a first output disc disposed coaxially with each other; and a first power roller tiltably interposed between the first input disc and the first output disc and configured to transmit a driving force from the first input disc to the first output disc; and a second transmission unit disposed coaxially with the first transmission unit, the second transmission unit including: a second input disc and a second output disc disposed coaxially with each other; and a second power roller tiltably interposed between the second input disc and the second output disc and configured to transmit a driving force from the second input disc to the second output disc, the second transmission unit being disposed such that a back surface of the second input disc is opposed to a back surface of the first input disc, in which the back surface of the first input disc is provided with a back surface cylinder wall of a tubular shape protruding therefrom so as to be concentric with the first input disc, and the back surface of the second input disc is provided with a back surface cylinder wall of a tubular shape protruding therefrom so as to be concentric with the second input disc. A back surface of the second output disc may be opposed to a back surface of the first output disc. In this case the back surface of the first output disc may be provided with a back surface cylinder wall of a tubular shape protruding therefrom so as to be concentric with the first output disc, and the back surface of the second output disc may be provided with a back surface cylinder wall of a tubular shape protruding therefrom so as to be concentric with the second output disc.

According to this configuration, in a double-cavity-type toroidal continuously variable transmission, by forming the two input discs adjacent to each other at an axially central portion as separate members and providing back surface cylinder walls on respective back surfaces, opposed to each other, of these two discs such that the back surface cylinder walls project therefrom, it is made possible to efficiently dispose an input gear and a bearing for disc supporting between the back surfaces of the discs by using the back surface cylinder walls. As a result, a structure can be easily achieved which can reduce oil agitation loss by the gear while suppressing an increase in the size of the continuously variable transmission and maintaining high reliability. Also in the case with a configuration in which two output discs are adjacent to each other at the axially central portion, members at the power input and output sides are only interchanged with each other, and the same advantageous effects as described above are obtained.

In one embodiment of the present invention, each back surface cylinder wall may have an outer periphery connected to an input gear configured to input power to the toroidal continuously variable transmission, in which the outer periphery is connected to the input gear so as to be non-rotatable relative to each other. According to this configuration, the outer periphery diameter of the gear disposed between the back surfaces of the discs can be set so as to be small as compared to the case where a gear is provided at an outer peripheral portion of the disc. Thus, the circumferential speed of the gear is reduced, so that loss by oil agitation resistance can be effectively reduced.

In one embodiment of the present invention, a bearing may be included between an inner peripheral surface of each back surface cylinder wall and an outer peripheral surface of the input shaft, the bearing rotatably supporting the input disc and the input gear on an input shaft. According to this configuration, the bearing can be disposed by effectively using a space between the back surfaces of the discs.

In one embodiment of the present invention, one axial end of the input gear may be in contact with the back surface of the first input disc, and the other axial end of the input gear may be in contact with the back surface of the second input disc. According to this configuration, axial deformation (falling-down in the axial direction) of the first input disc and the second input disc by the power roller can be suppressed by the input gear, without providing an additional member.

In the toroidal continuously variable transmission according to one embodiment of the present invention, annular support spacers may be interposed between one axial end of each external tooth of the input gear and the back surface of the first input disc and between the other axial end of each external tooth of the input gear and the back surface of the second input disc, respectively. According to this configuration, both input discs can be stably supported in the axial direction with a supporting position on the disc back surface being shifted further to the outer diameter side, without increasing the outer diametric dimension of the input gear.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
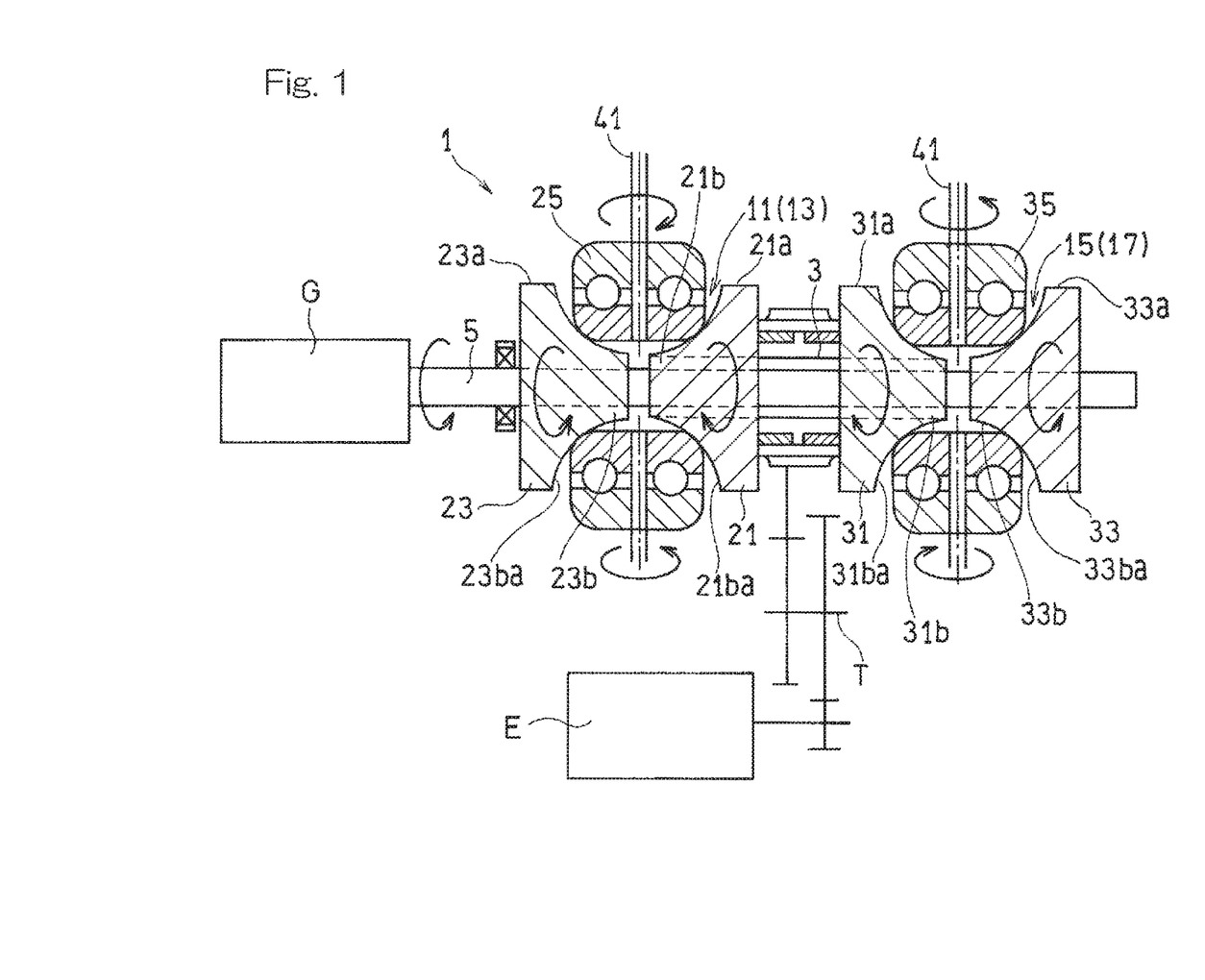
FIG. 1 is a longitudinal cross-sectional view schematically showing a schematic configuration of a toroidal continuously variable transmission according to a first embodiment of the present invention.

Hereinafter, embodiments of the present invention will be described with reference to the drawings. FIG. 1 is a longitudinal cross-sectional view schematically showing a toroidal continuously variable transmission (hereinafter, referred to simply as a "continuously variable transmission") 1 according to a first embodiment of the present invention. The continuously variable transmission 1 is provided between an aircraft engine E that is a drive source and a generator G that is a load device driven by the engine E. The continuously variable transmission 1 transmits a driving force of the engine E to the generator G while keeping a rotation rate of the generator G constant. A constant frequency generator mainly includes the continuously variable transmission 1 and the generator G.

The engine E is connected to the input shaft 3, which is formed so as to be hollow, of the continuously variable transmission 1 via a power transmission mechanism T. Power inputted to the input shaft 3 is outputted via the continuously variable transmission 1 from the output shaft 5 that is concentrically disposed at a hollow portion of the input shaft 3, to the generator G.

As shown in FIG. 1, the continuously variable transmission 1 is designed as a double-cavity-type toroidal continuously variable transmission. Specifically, the continuously variable transmission 1 includes: a first toroidal transmission unit 13 that forms a first cavity 11; and a second toroidal transmission unit 17 that forms a second cavity 15. The first toroidal transmission unit 13 and the second toroidal transmission unit 17 are disposed on the common output shaft 5 so as to be spaced apart from each other at a predetermined interval.

The first toroidal transmission unit 13 includes a first input disc 21, which is rotatably supported on the input shaft 3, a first output disc 23, which rotates in conjunction with the output shaft 5, and a plurality of (for example, two) first power rollers 25, which are interposed between the first input disc 21 and the first output disc 23. Similarly, the second toroidal transmission unit 17 includes a second input disc 31, which is rotatably supported on the input shaft 3, a second output disc 33, which rotates together with the output shaft 5, and a plurality of (e.g., two) second power rollers 35, which are interposed between the second input disc 31 and the second output disc 33.

The respective discs 21, 23, 31, and 33 include disc-shaped base portions 21a, 23a, 31a, and 33a and projection portions 21b, 23b, 31b, and 33b that project from the base portions 21a, 23a, 31a, and 33a in an axial direction such that diameters thereof are gradually reduced. Side surfaces of the projection portions 21b, 23b, 31b, and 33b are formed as curved concave surfaces 21ba, 23ba, 31ba, and 33ba, respectively. The first input disc 21 and the first output disc 23 are disposed such that the projection portions 21*b* and 23*b* thereof are opposed to each other. Similarly, the second input disc 31 and the second output disc 33 are disposed such that the projection portions 31*b* and 33*b* thereof are opposed to each other.

Each of the power rollers 25 and 35 is supported by a thrust bearing and a trunnion, which is a known support member, so as to be rotatable about a roller shaft 41 and be tiltable about a tilt shaft located at a position skewed relative to the input shaft 3. The power rollers 25 and 35 supported thus are pressed against the concave surfaces 21*ba* and 31*ba* of the input discs 21, 31 and the concave surfaces 23*ba* and 33*ba* of the output disc 23 and 33, respectively, at high pressure by power of a pressing force adding mechanism (not shown) that generates a pressing force to the power rollers 25 and 35.

In other words, the pressing force adding mechanism presses three rolling elements, that is, the first input disc 21, the first output disc 23, and the first power roller 25 against each other at high pressure in the first cavity 11. A driving force is transmitted between the input disc 21, the output disc 23, and the power roller 25 through shearing resistance of high-viscosity lubricating oil films generated at contact portions between both discs 21 and 23 and the power roller 25, that is, fluid friction. The same applies to the second cavity 15. Change of an acceleration ratio and a deceleration ratio of the continuously variable transmission 1, that is, change of a gear ratio thereof is performed by controlling tilt angles that are tilts of the power rollers 25 and 35.

Figure 2:
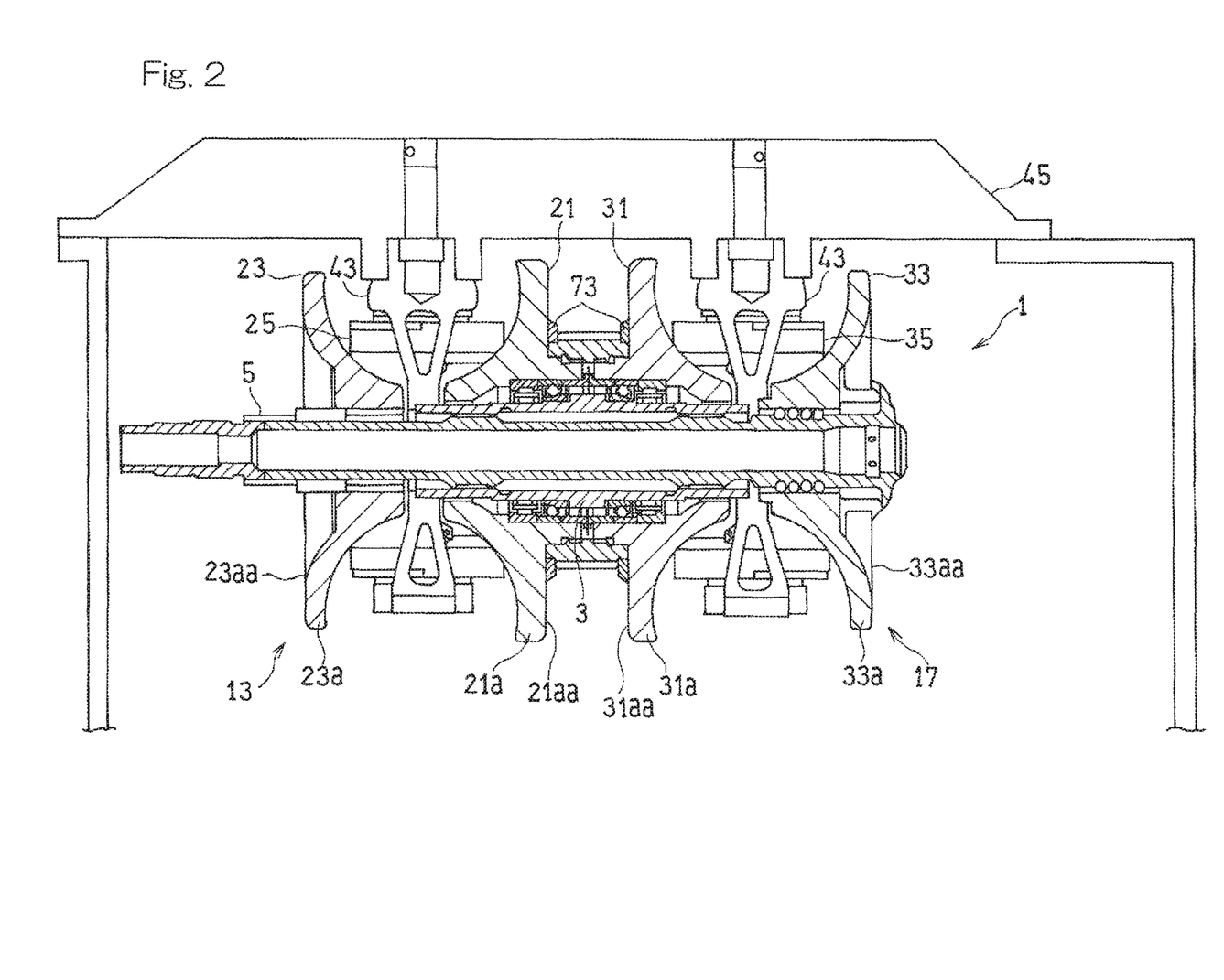
FIG. 2 is a longitudinal cross-sectional view showing a configuration example of the toroidal continuously variable transmission in FIG. 1.

As shown in FIG. 2, the first toroidal transmission unit 13 and the second toroidal transmission unit 17 are disposed such that the input discs 21 and 31 thereof or the output discs 23 and 33 thereof are formed as separate members and are adjacent to each other in the axial direction. In other words, the first toroidal transmission unit 13 and the second toroidal transmission unit 17 are disposed such that back surfaces (bottom surfaces of the base portions 21*a* and 31*a*) 21*aa* and 31*aa* of the input discs 21 and 31 thereof or back surfaces (bottom surfaces of the base portions 23*a* and 33*a*) 23*aa* and 33*aa* of the output discs 23 and 33 thereof are opposed to each other. The first toroidal transmission unit 13 and the second toroidal transmission unit 17 in the present embodiment are disposed such that the back surfaces 21*aa* and 31*aa* of the input discs 21 and 31 thereof are opposed to each other. The continuously variable transmission 1 is supported by a housing 45 via two supporting columns 43, 43 that are disposed between the first input disc 21 and the first output disc 23 and between the second input disc 31 and the second output disc 33, respectively.

Figure 3:
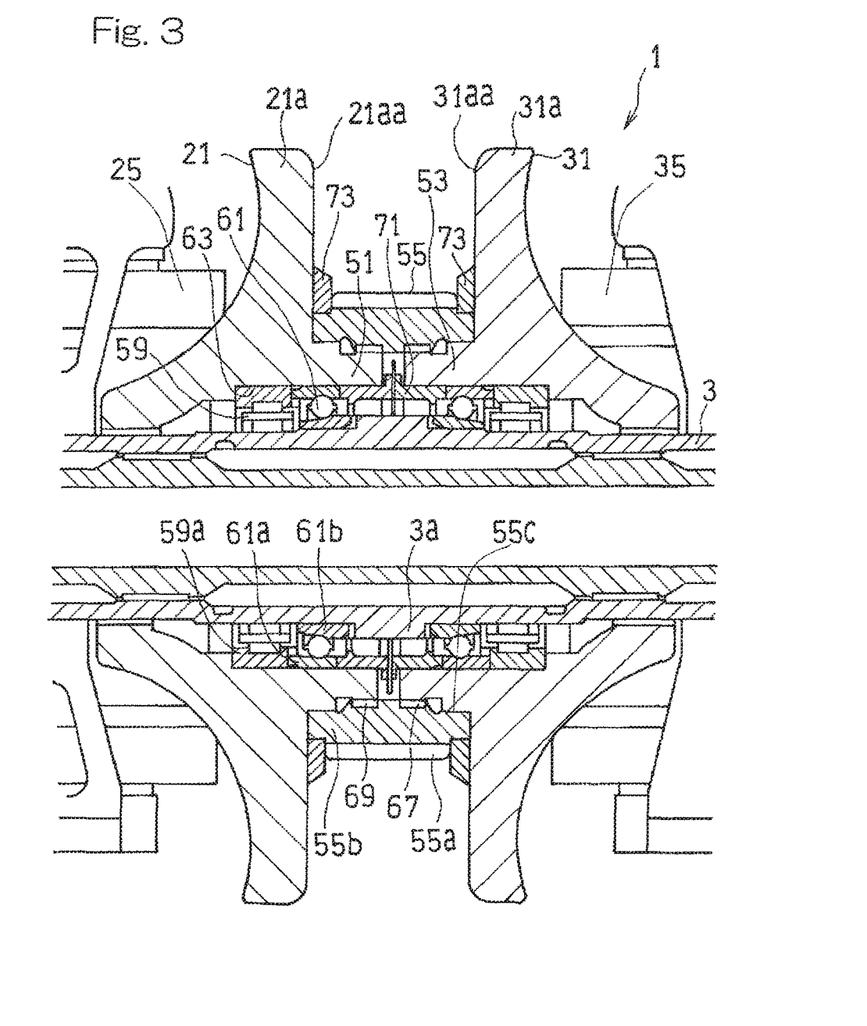
FIG. 3 is a longitudinal cross-sectional view showing a portion of the toroidal continuously variable transmission in FIG. 2.

FIG. 3 shows one example of specific configuration for an axially center portion of the continuously variable transmission 1 according to the present embodiment. On the respective back surfaces 21*aa* and 31*aa* of the two discs (the first input disc 21 and the second input disc 31 in the illustrated example) disposed at the axially central portion of the continuously variable transmission 1 such that the back surfaces thereof are opposed to each other, tubular back surface cylinder walls 51 and 53 are respectively provided so as to project therefrom in the axial direction. The input gear 55 having an external tooth gear is connected over outer peripheral portions of both back surface cylinder walls 51 and 53 aligned in the axial direction. In other words, the input gear 55 is provided on the outer peripheral portions of both back surface cylinder walls 51 and 53 of the first input disc 21 and the second input disc 31 concentrically with these input discs 21, 31 so as to cover both back surface cylinder walls 51 and 53 from the radially outer side. Power from the engine E (FIG. 1) is inputted via the input gear 55 to the continuously variable transmission 1.

The first input disc 21, the second input disc 31, and the input gear 55 are connected to each other so as to be non-rotatable relative to each other. In addition, the first input disc 21, the second input disc 31, and the input gear 55 are rotatably supported on the tubular input shaft 3 via respective bearings, which will be described below. The input shaft 3 is rotatably mounted on the outer periphery of the output shaft 5, which is a main shaft, via a bearing (not shown) such as a needle roller bearing, and is supported at both ends thereof by the supporting columns 43 from above. The bearings that rotatably support the first input disc 21, the second input disc 31, and the input gear 55 on the input shaft 3 are selected and disposed so as to be able to bear both a load in the radial direction and a load in the axial direction. In the illustrated example, a cage-equipped roller bearing 59 as a bearing for bearing a load in the radial direction and an angular contact ball bearing 61 for bearing both a load in the radial direction and a load in the axial direction are used in combination.

The cage-equipped roller bearings 59 are interposed between the inner peripheral surface of the first input disc 21 and the outer peripheral surface of the input shaft 3, and between the inner peripheral surface of the second input disc 31 and the outer peripheral surface of the input shaft 3, respectively. A portion of the inner peripheral portion of each of the input discs 21 and 31 at which portion the cage-equipped roller bearing 59 is disposed has an annular recess portion 63 formed so as to be recessed in the radially outward direction by a length corresponding to the roller diameter of the cage-equipped roller bearing 59. An outer ring 59*a* of the cage-equipped roller bearing 59 is fitted to a peripheral wall surface of the annular recess portion 63.

An axially central portion of the input shaft 3 is formed as a large-diameter portion 3*a* having a larger outer diameter than the other portion of the input shaft 3. The angular contact ball bearing 61 is interposed between the large-diameter portion 3*a* and each of the cage-equipped roller bearings 59, 59. The angular contact ball bearings 61 are disposed at axial positions at the inner peripheral sides of the back surface cylinder walls 51 and 53 of both input discs 21 and 31. Therefore, the angular contact ball bearings 61 receive loads in the axial direction applied to both input discs 21 and 31, and receive loads in the radial direction applied to both back surface cylinder walls 51 and 53. In other words, the input gear 55 is rotatably supported on the input shaft 3 via both back surface cylinder walls 51 and 53 through the angular contact ball bearings 61. In addition, the back surface cylinder walls 51 and 53 function as bearing supports that support the angular contact ball bearings 61. In the illustrated example, the outer diameter of an outer ring 61*a* of each angular contact ball bearing 61 is substantially equal to the outer diameter of the outer ring 59*a* of each cage-equipped roller bearing 59.

However, the selection and arrangement of the bearings for rotatably supporting the first input disc 21, the second input disc 31, and the input gear 55 on the input shaft 3 are not limited to the illustrated example. For example, as the bearings for supporting the discs in the axial direction, thrust ball bearings may be used in place of the angular contact ball bearings 61.

A spline (gear-side spline) 67 is formed, as a connection mechanism that establishes a connection in a relatively non-rotatable manner, on an inner peripheral surface 55*c* of a cylindrical base portion 55*b* supporting external teeth 55*a* of the input gear 55 (i.e., the inner peripheral surface of the input gear 55) and over the entire circumference thereof. Meanwhile, a spline (disc-side spline) 69 is formed, as the connection mechanism that establishes a connection in a relatively non-rotatable manner, also on each of outer peripheral surfaces 51b and 53b of both back surface cylinder walls 51 and 53 of the first input disc 21 and the second input disc 31 and over the entire circumference thereof. By fitting the disc-side splines 69 to the gear-side spline 67, the input gear 55, the first input disc 21, and the second input disc 31 are connected to each other so as to be non-rotatable relative to each other.

Figure 4:
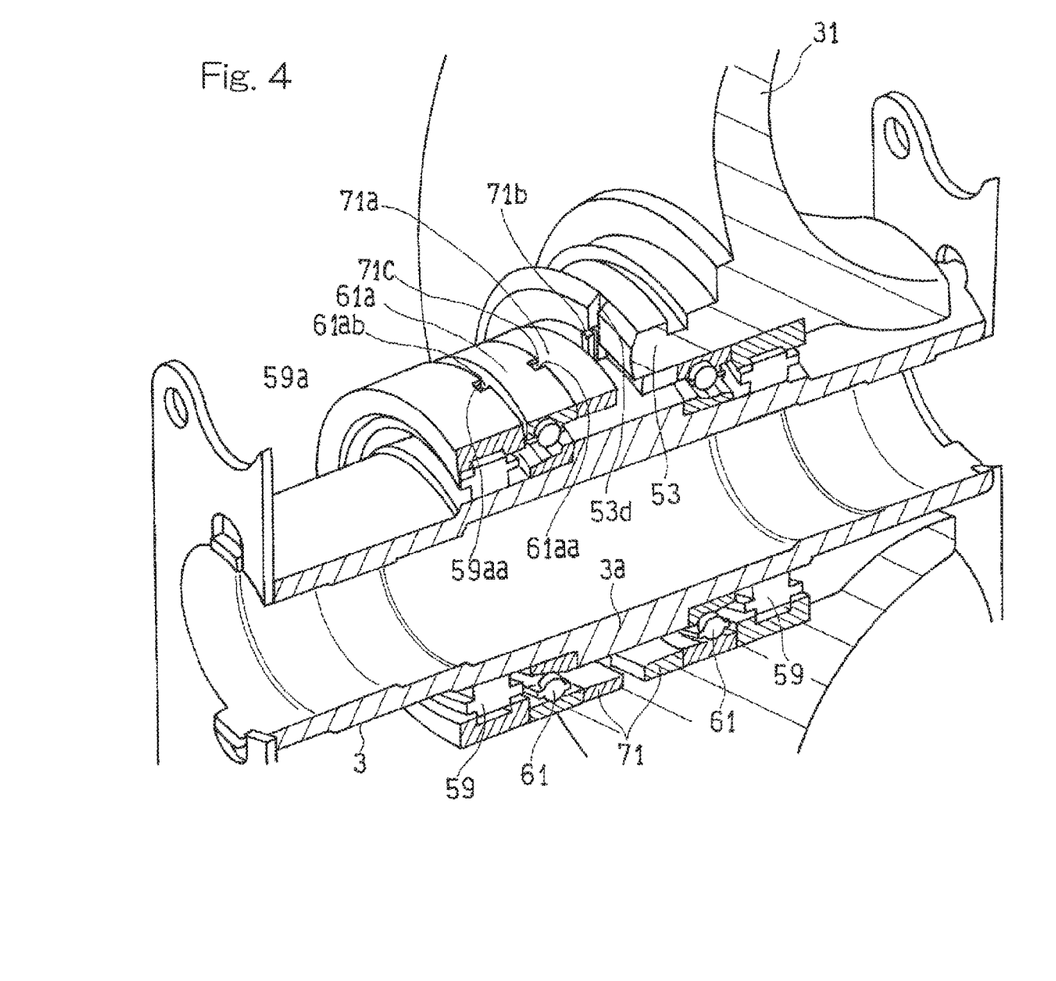
FIG. 4 is a partially cutaway perspective view showing a mounting structure for a rotation stopper groove member used in the toroidal continuously variable transmission in FIG. 1.

Next, a mechanism for preventing the input discs 21 and 31, which are rotating members with respect to the input shaft 3, and the outer rings 61a and 59a of the respective bearings from rotating relative to each other will be described. A pair of annular rotation stopper ring members 71, 71 are interposed, as a relative rotation stopper groove member that prevents the input discs 21 and 31 and the angular contact ball bearings 61, 61 from rotating relative to each other, between the input gear 55, the back surface cylinder wall 51 of the first input disc, the back surface cylinder wall 53 of the second input disc, the angular contact ball bearing 61 at the first input disc side, and the angular contact ball bearing 61 at the second input disc side. As shown in FIG. 4, each rotation stopper ring member 71 includes an annular main body portion 71a and a rod-shaped (prismatic-column-shaped in this example) radial projection 71b that is provided at one axial end of the main body portion 71a and projects radially outward. In addition, rotation stopper grooves 51d and 53d (only the rotation stopper groove 53d is shown in FIG. 4) that are fitted to the radial projections 71b are formed on portions, corresponding to the radial projections 71b of the rotation stopper ring members 71, of end surfaces of the back surface cylinder walls 51 and 53 (only the back surface cylinder wall 53 is shown in FIG. 4) which end surfaces face in the axial direction. The rotation stopper grooves 51d and 53d extend on the end surfaces of the back surface cylinder walls 51 and 53 which end surfaces face in the axial direction, in the radial direction so as to correspond to the radial projections 71b.

Furthermore, engagement mechanisms described below are provided between the rotation stopper ring member 71 and the outer ring 61a of the angular contact ball bearing 61 that are adjacent to each other in the axial direction, and between the outer ring 61a of the angular contact ball bearing 61 and the outer ring 59a of the cage-equipped roller bearing 59 that are adjacent to each other in the axial direction, respectively.

Each rotation stopper ring member 71 further includes an axial projection 71c that projects in the axial direction from the other axial end of the main body portion 71a. Meanwhile, as shown in FIG. 4, the outer diameter of the main body portion 71a of each rotation stopper ring member 71 is set so as to be substantially equal to the outer diameter of the outer ring 61a of each angular contact ball bearing 61, and the outer ring 61a of each angular contact ball bearing 61 is provided with an engagement recess portion 61aa that is brought into engagement with the axial projection 71c of the rotation stopper ring member 71. The axial projections 71c of the rotation stopper ring members 71 are engaged with the engagement recess portions 61aa of the outer rings 61a of both angular contact ball bearings 61, and the radial projections 71b of the rotation stopper ring members 71 are fitted to the respective rotation stopper grooves 51d and 53d of the back surface cylinder walls 51 and 53 of both input discs 21 and 31. Furthermore, the end surface at the cage-equipped roller bearing 59 side, facing in the axial direction, of the outer ring 61a of each angular contact ball bearing 61 is provided with an engagement projection 61ab that projects in the axial direction. The engagement projection 61ab is engaged with an engagement recess portion 59aa provided on the end surface at the angular contact ball bearing 61 side, facing in the axial direction, of the outer ring 59a of the cage-equipped roller bearing 59. In this manner, the input discs 21 and 31, which are rotating members for the input shaft 3, the rotation stopper ring members 71, the outer rings 61a and 59a of the respective bearings are prevented from rotating relative to each other.

Each of the radial projection 71b and the axial projection 71c of each rotation stopper ring member 71 is provided at two locations on the main body portion 71a in the circumferential direction in the present embodiment, but may be provided at only one location on the main body portion 71a in the circumferential direction, or may be provided at three or more locations thereon. Similarly, each of the engagement projection and the engagement recess portion on the outer rings 61a and 59a of the respective bearings may be provided at only one location in the circumferential direction or may be provided at three or more locations in the circumferential direction.

Figure 5:
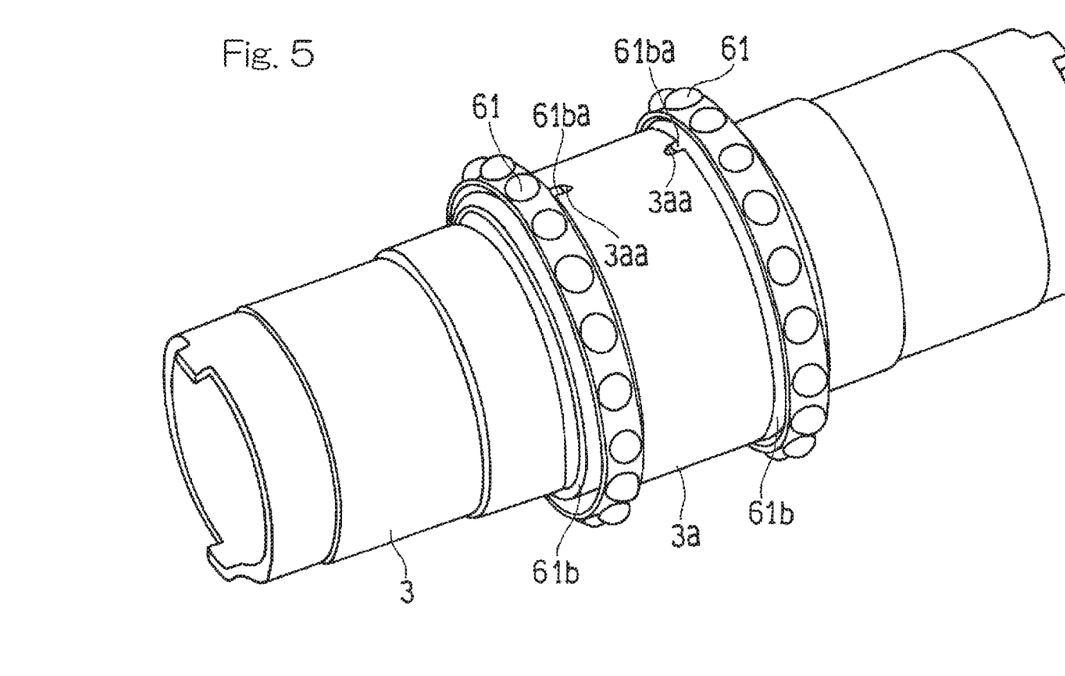
FIG. 5 is a partially cutaway perspective view showing a mounting structure for bearings used in the toroidal continuously variable transmission in FIG. 1.

As shown in FIG. 5, each angular contact ball bearing 61 includes an inner ring 61b having an end surface, in contact with the large-diameter portion 3a of the input shaft 3, which is provided with an engagement projection 61ba that projects in the axial direction. The engagement projection 61ba is engaged with an engagement recess portion 3aa formed on a step surface of the large-diameter portion 3a which step surface faces in the axial direction. In this manner, the inner ring 61b and the input shaft 3 which is a fixed-side member are prevented from rotating relative to each other.

As shown in FIG. 3, the axial length of the cylindrical base portion 55b of the input gear 55 is set so as to be longer than the axial length of each external tooth 55a. One axial end of the base portion 55b is in contact with a portion, at the outer diameter side of the back surface cylinder wall 51, of the back surface 21aa of the first input disc 21, and the other axial end of the base portion 55b is in contact with a portion, at the outer diameter side of the back surface cylinder wall 53, of the back surface 31aa of the second input disc 31. In other words, the first input disc 21 and the second input disc 31 are supported in the axial direction at the back surface side thereof by the input gear 55.

Furthermore, annular support spacers 73 are interposed between one axial end of each external tooth 55a of the input gear 55 and the back surface 21aa of the first input disc 21 and between the other axial end of each external tooth 55a of the input gear 55 and the back surface 31aa of the second input disc 31, respectively. The first input disc 21 and the second input disc 31 are supported in the axial direction at the back surface side thereof via the support spacers 73 further by the input gear 55. Although the support spacers 73 may be omitted, by interposing the support spacers 73 between both ends of each external tooth 55a of the input gear 55 located at the outer side with respect to the base portion 55b and the back surfaces 21aa and 31aa of both input discs, both input discs 21 and 31 can be stably supported in the axial direction with a support position on each disc back surface being shifted further to the outer diameter side, without increasing the outer diametric dimension of the input gear 55. Thus, as in the illustrated example, each of the outer diameter dimensions of the surfaces of the support spacers 73 that are in contact with the disc back surfaces 21aa and 31aa may be set so as to be larger than the outer diameter dimension of each external tooth 55a of the input gear 55.

The external teeth 55a of the input gear 55 preferably have a small diameter from the standpoint that resistance of oil agitation by the input gear 55 is reduced and the radial dimension of the continuously variable transmission 1 is reduced. Specifically, the outer peripheral end of each external tooth 55a of the input gear 55 may be located radially inward of the outer peripheral ends of the input discs 21 and 31. In addition, the radial position at which the base portion 55b of the input gear 55 is provided may be close to the outer peripheral ends of the input discs 21 and 31 in order to effectively suppress axial deformation of the input discs 21 and 31, that is, falling down due to loads applied from the power rollers 25 and 35. Specifically, the radial position of the inner peripheral surface of the base portion 55b of the input gear 55 may be radially outward of the radial position of each of contact points between the projection portions 21b and 31b of the input discs 21 and 31 and the power rollers in a state where the tilt angles of the power rollers 25 and 35 are zero (deceleration ratio=1).

In the toroidal continuously variable transmission 1 according to the present embodiment, which is the double-cavity-type toroidal continuously variable transmission 1, by forming the two input discs 21 and 31 adjacent to each other at the axially central portion as separate members and providing the back surface cylinder walls 51 and 53 on the back surfaces 21aa and 31aa, opposed to each other, of the two input discs 21 and 31 such that the back surface cylinder walls 51 and 53 project therefrom, it is made possible to efficiently dispose the input gear 55 and the bearings 57 for disc supporting between the back surfaces of the input discs 21 and 31 by using the back surface cylinder walls 51 and 53. As a result, a structure can be easily achieved which can reduce oil agitation loss by the input gear 55 while suppressing an increase in the size of the continuously variable transmission 1 and maintaining high reliability.

In the present embodiment, the example has been shown in which the respective input discs 21 and 31 of the first toroidal transmission unit 13 and the second toroidal transmission unit 17 are disposed at the axially central portion of the entire continuously variable transmission 1 such that the back surfaces thereof are opposed to each other. However, the respective output discs 23 and 33 may be disposed at the axially central portion of the entire continuously variable transmission 1 such that the back surfaces 23aa and 33aa thereof are opposed to each other. The continuously variable transmission 1 may be configured thus particularly when the continuously variable transmission 1 is used with such setting that the rotation speed at the output discs 23 and 33 side is higher than that at the input side. In the case where the output discs 23 and 33 are disposed so as to be adjacent to each other in the axially central portion, back surface cylinder walls are provided on the respective back surfaces 23aa and 33aa of the output discs 23 and 33, and an output gear is disposed between the back surfaces 23aa and 33aa. In the case with such a configuration, the members at the power input and output sides are only interchanged with each other, and the same advantageous effects as those in the above-described embodiment are obtained.

In the description of each of the above-described embodiments, the toroidal continuously variable transmission used in the IDG for an aircraft has been described as an example. However, the use of the toroidal continuously variable transmission to which the present invention is applied is not limited to an aircraft, and may be, for example, for an automobile.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Continuously variable transmission
13 . . . First transmission unit
17 . . . Second transmission unit
21 . . . First input disc
21aa . . . Back surface of first input disc
23 . . . First output disc
25 . . . First power roller
31 . . . Second input disc
31aa . . . Back surface of second input disc
33 . . . Second output disc
35 . . . Second power roller
51, 53 . . . Back surface cylinder wall
55 . . . Input gear

What is claimed is:

1. A toroidal continuously variable transmission comprising:
   a first transmission unit including:
      a first input disc and a first output disc disposed coaxially with each other; and
      a first power roller tiltably interposed between the first input disc and the first output disc and configured to transmit a driving force from the first input disc to the first output disc; and
   a second transmission unit disposed coaxially with the first transmission unit, the second transmission unit including:
      a second input disc and a second output disc disposed coaxially with each other; and
      a second power roller tiltably interposed between the second input disc and the second output disc and configured to transmit a driving force from the second input disc to the second output disc, the second transmission unit being disposed such that a back surface of the second input disc is opposed to a back surface of the first input disc,
   wherein the back surface of the first input disc is provided with a back surface cylinder wall of a tubular shape protruding therefrom so as to be concentric with the first input disc, and the back surface of the second input disc is provided with a back surface cylinder wall of a tubular shape protruding therefrom so as to be concentric with the second input disc.

2. The toroidal continuously variable transmission as claimed in claim 1, wherein each back surface cylinder wall has an outer periphery connected to an input gear configured to input power to the toroidal continuously variable transmission, the outer periphery being connected to the input gear so as to be non-rotatable relative to each other.

3. The toroidal continuously variable transmission as claimed in claim 2, further comprising a bearing between an inner peripheral surface of each back surface cylinder wall and an outer peripheral surface of an input shaft, the bearing rotatably supporting the input disc and the input gear on the input shaft.

4. The toroidal continuously variable transmission as claimed in claim 2, wherein one axial end of the input gear is in contact with the back surface of the first input disc, and the other axial end of the input gear is in contact with the back surface of the second input disc.

5. The toroidal continuously variable transmission as claimed in claim 4, further comprising an annular support spacers interposed between one axial end of each external tooth of the input gear and the back surface of the first input disc and/or between the other axial end of each external tooth of the input gear and the back surface of the second input disc.

6. A toroidal continuously variable transmission comprising:
- a first transmission unit including:
  - a first input disc and a first output disc disposed coaxially; and
  - a first power roller tiltably interposed between the first input disc and the first output disc and configured to transmit a driving force from the first input disc to the first output disc; and
- a second transmission unit disposed coaxially with the first transmission unit, the second transmission unit including:
  - a second input disc and a second output disc disposed coaxially; and
  - a second power roller tiltably interposed between the second input disc and the second output disc and configured to transmit a driving force from the second input disc to the second output disc, the second transmission unit being disposed such that a back surface of the second output disc is opposed to a back surface of the first output disc,
- wherein the back surface of the first output disc is provided with a back surface cylinder wall of a tubular shape protruding therefrom so as to be concentric with the first output disc, and the back surface of the second output disc is provided with a back surface cylinder wall of a tubular shape protruding therefrom so as to be concentric with the second output disc.

\* \* \* \* \*